US012561019B2

(12) United States Patent
Lee et al.

(10) Patent No.: US 12,561,019 B2
(45) Date of Patent: Feb. 24, 2026

(54) TOUCH-CONTROL METHOD, ELECTRONIC DEVICE, AND TOUCH-CONTROL SYSTEM

(71) Applicant: Getac Technology Corporation, New Taipei (TW)

(72) Inventors: Jiunn-Jye Lee, Taipei (TW); Tzu-Yi Chuang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 151 days.

(21) Appl. No.: 18/426,436

(22) Filed: Jan. 30, 2024

(65) Prior Publication Data

US 2025/0156003 A1    May 15, 2025

(30) Foreign Application Priority Data

Nov. 9, 2023    (CN) .......................... 202311490061.6

(51) Int. Cl.
G06F 3/041        (2006.01)
G09G 3/20        (2006.01)

(52) U.S. Cl.
CPC ......... G06F 3/0416 (2013.01); G09G 3/2003 (2013.01); G09G 2320/0626 (2013.01); G09G 2360/144 (2013.01)

(58) Field of Classification Search
CPC ................ G06F 3/0416; G09G 3/2003; G09G 2320/0626; G09G 2360/144
USPC ................................................. 345/173–174
See application file for complete search history.

(56) References Cited

U.S. PATENT DOCUMENTS 9,622,326 B1 *    4/2017    Devyver .............. G09G 3/3406
10,665,204 B1 *    5/2020    Goodsitt .................. G09G 5/10

2011/0074737 A1       3/2011    Hsieh et al.
2016/0240167 A1 *    8/2016    Breazile .............. G09G 3/3406
2016/0299635 A1      10/2016    Glover et al.
2018/0088797 A1 *    3/2018    Mcatee .................... G08B 5/36
(Continued)

FOREIGN PATENT DOCUMENTS

CN       102473061 A  *  5/2012  .......... G06F 3/0425
CN       105389106 A      3/2016
(Continued)

OTHER PUBLICATIONS

Search Report issued on Nov. 4, 2024 for EP application No. 24174472.1, 9 pages.

*Primary Examiner* — Kwin Xie

(74) *Attorney, Agent, or Firm* — Cooper Legal Group, LLC

(57)        ABSTRACT

A touch-control method, an electronic device, and a touch-control system are provided. The touch-control method includes: obtaining an ambient brightness level via a light sensor; recording a duration in which the ambient brightness level is lower than a threshold, and determining, in response to the duration being greater than a predetermined minimum time length and less than a predetermined maximum time length, whether or not a first brightness characteristic of the ambient brightness level before the duration matches a second brightness characteristic of the ambient brightness level after the duration; and determining, in response to determining that the first brightness characteristic matches the second brightness characteristic, occurrence of a touch-control behavior, and triggering the electronic device to perform an operation corresponding to the touch-control behavior.

20 Claims, 7 Drawing Sheets

(56)　　　　　　　References Cited

U.S. PATENT DOCUMENTS

2018/0336866 A1*　11/2018　Triverio ............. G06F 3/04883
2019/0096357 A1　　3/2019　Lee
2020/0160813 A1*　5/2020　Aurongzeb ............. G09G 3/36
2021/0125550 A1*　4/2021　Chen ................... G09G 3/3208

FOREIGN PATENT DOCUMENTS

CN　　　　105511631 B　　8/2018
CN　　　　110956939 A　*　4/2020　............. G09G 5/10
EP　　　　　2884383 A1　　6/2015
TW　　　　201419121 A　　5/2014
TW　　　　202042022 A　　11/2020
TW　　　　M640215 U　　4/2023

* cited by examiner

TOUCH-CONTROL METHOD, ELECTRONIC DEVICE, AND TOUCH-CONTROL SYSTEM

CROSS-REFERENCE TO RELATED PATENT APPLICATION

This application claims the benefit of priority to China Patent Application No. 202311490061.6, filed on Nov. 9, 2023, in the People's Republic of China. The entire content of China Patent Application No. 202311490061.6 is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a touch-control technology, and more particularly to a touch-control method, an electronic device, and a touch-control system that use a light sensor as a touch-control button.

BACKGROUND OF THE DISCLOSURE

In conventional technology, physical buttons of an electronic device are normally used for specific functions, and the quantity of the physical buttons is limited and unable to be increased. As such, current electronic devices (such as mobile phones and tablets) generate virtual buttons on their screens as touch-control buttons. However, virtual buttons have problems of taking up screen space and requiring position identification by the human eye.

In addition, electronic devices generally apply light sensors to obtain the brightness of ambient light, and adjust the brightness of a screen accordingly. Under these circumstances, the purpose and the function of light sensors are not diversified.

SUMMARY OF THE DISCLOSURE

In response to the above-referenced technical inadequacies, the present disclosure provides a touch-control method, an electronic device, and a touch-control system.

In order to solve the above-mentioned problems, one of the technical aspects adopted by the present disclosure is to provide a touch-control method. The touch-control method is applied to an electronic device that includes a light sensor and a processor. The touch-control method is executed by the processor, and includes: obtaining an ambient brightness level via the light sensor; recording a duration in which the ambient brightness level is lower than a threshold, and determining, in response to the duration being greater than a predetermined minimum time length and less than a predetermined maximum time length, whether or not a first brightness characteristic of the ambient brightness level before the duration matches a second brightness characteristic of the ambient brightness level after the duration; and determining, in response to determining that the first brightness characteristic matches the second brightness characteristic, occurrence of a touch-control behavior, and triggering the electronic device to perform an operation corresponding to the touch-control behavior.

In order to solve the above-mentioned problems, another one of the technical aspects adopted by the present disclosure is to provide an electronic device. The electronic device includes a light sensor and a processor. The processor is coupled to the light sensor, and is configured to execute processes of: obtaining an ambient brightness level via the light sensor; recording a duration in which the ambient brightness level is lower than a threshold, and determining, in response to the duration being greater than a predetermined minimum time length and less than a predetermined maximum time length, whether or not a first brightness characteristic of the ambient brightness level before the duration matches a second brightness characteristic of the ambient brightness level after the duration; and determining, in response to determining that the first brightness characteristic matches the second brightness characteristic, occurrence of a touch-control behavior, and triggering the electronic device to perform an operation corresponding to the touch-control behavior.

In order to solve the above-mentioned problems, yet another one of the technical aspects adopted by the present disclosure is to provide a touch-control system. The touch-control system includes an electronic device, a light sensor, and a processor. The processor is coupled to the light sensor and the electronic device, and is configured to execute processes of: obtaining an ambient brightness level via the light sensor; recording a duration in which the ambient brightness level is lower than a threshold, and determining, in response to the duration being greater than a predetermined minimum time length and less than a predetermined maximum time length, whether or not a first brightness characteristic of the ambient brightness level before the duration matches a second brightness characteristic of the ambient brightness level after the duration; and determining, in response to determining that the first brightness characteristic matches the second brightness characteristic, occurrence of a touch-control behavior, and triggering the electronic device to perform an operation corresponding to the touch-control behavior.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
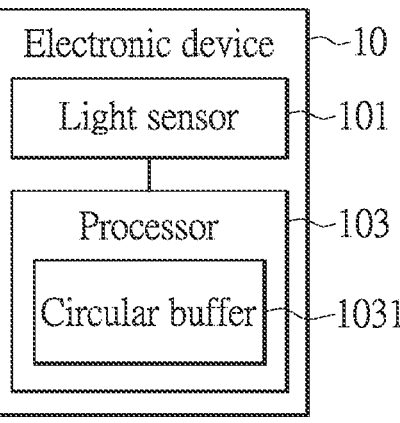
FIG. 1 is a functional block diagram of an electronic device according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
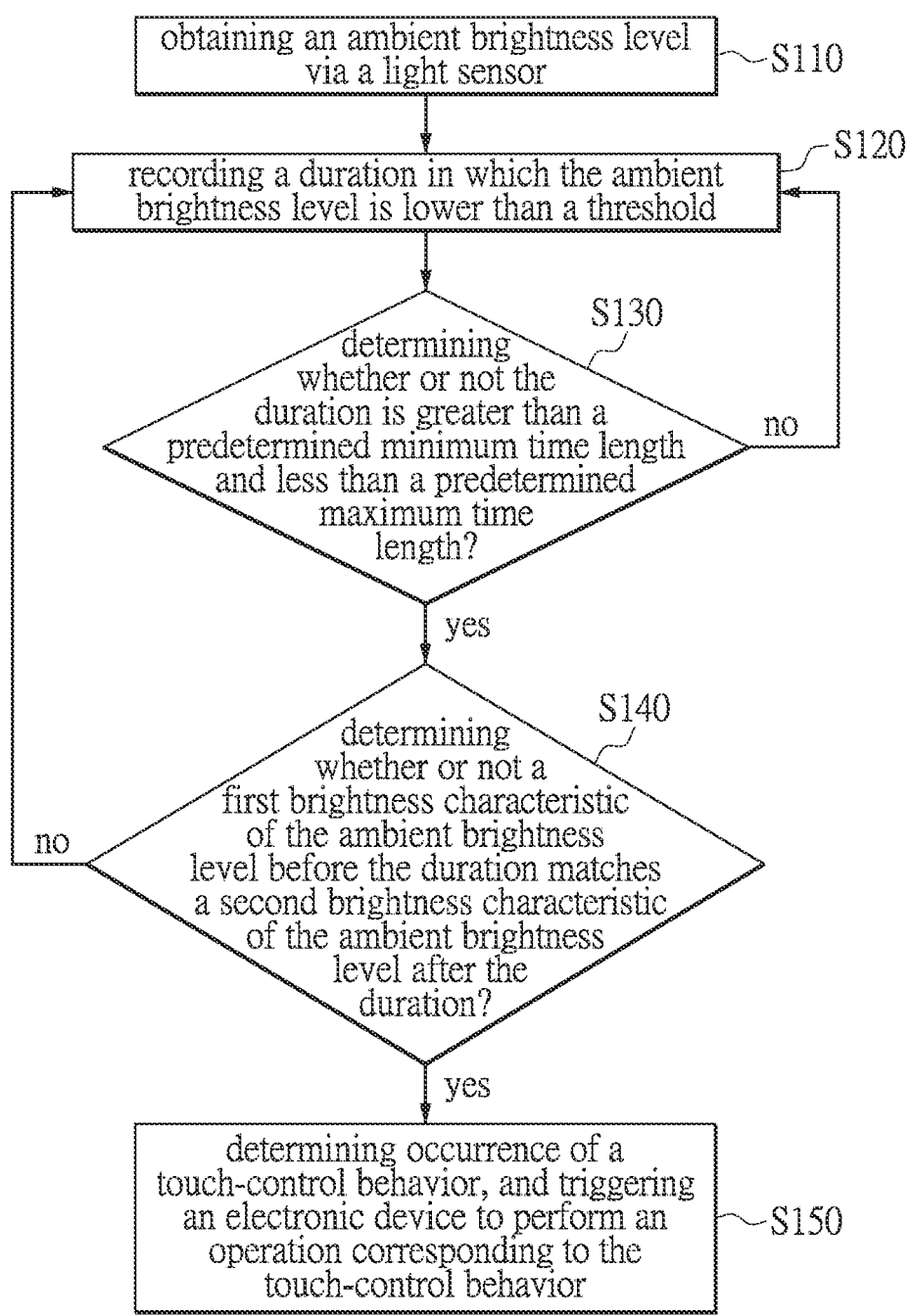
FIG. 2 is a flowchart of a touch-control method according to one embodiment of the present disclosure.

Referring to FIG. 1 and FIG. 2, FIG. 1 is a functional block diagram of an electronic device according to one embodiment of the present disclosure, and FIG. 2 is a flowchart of a touch-control method according to one embodiment of the present disclosure. As shown in FIG. 1, an electronic device 10 of the present embodiment includes a light sensor 101 and a processor 103.

The electronic device 10 can be, for example, a mobile phone or a tablet, but the present disclosure is not limited thereto. The light sensor 101 can be an ambient light sensor, and sends an ambient brightness level to the processor 103.

The processor 103 is coupled to the light sensor 101, and is configured to execute a touch-control method of the present embodiment. That is to say, the touch-control method of the present embodiment can be applied to the electronic device 10 that includes the light sensor 101 and the processor 103, and is executed by the processor 103.

The processor 103 can be implemented by cooperation of hardware (e.g., a CPU and a memory), software, and/or firmware. However, a specific implementation of the processor 103 is not limited in the present disclosure. As shown in FIG. 2, the touch-control method of the present embodiment includes the following processes.

Step S110: obtaining the ambient brightness level via a light sensor.

Step S120: recording a duration in which the ambient brightness level is lower than a threshold.

Step S130: determining whether or not the duration is greater than a predetermined minimum time length and less than a predetermined maximum time length. If yes, the touch-control method proceeds to step S140. If not, the touch-control method returns to step S120.

Step S140: determining whether or not a first brightness characteristic of the ambient brightness level before the duration matches a second brightness characteristic of the ambient brightness level after the duration. If yes, the touch-control method proceeds to step S150. If not, the touch-control method returns to step S120.

Step S150: determining occurrence of a touch-control behavior, and triggering the electronic device to perform an operation corresponding to the touch-control behavior.

Specifically, the touch-control method of the present embodiment can be an application running in a background, and the application can be defined to enable the light sensor 101 to have the function of acting as a touch-control button. Users can turn on or off the application according to their needs. When the application is turned on, the processor 103 may register the light sensor 101 in an operating system of the electronic device 10 to act as the touch-control button.

Furthermore, in step S110, the processor 103 can configure the light sensor 101 to periodically obtain the ambient brightness level, and sequentially save the ambient brightness level. The processor 103 can include a circular buffer 1031. The processor 103 can sequentially save the ambient brightness level with the circular buffer 1031, and the light sensor 101 is configured to periodically obtain the ambient brightness level according to a sampling frequency. For example, the sampling frequency of the present embodiment can be 20 times per second. However, the present disclosure is not limited thereto.

Figure 3A:
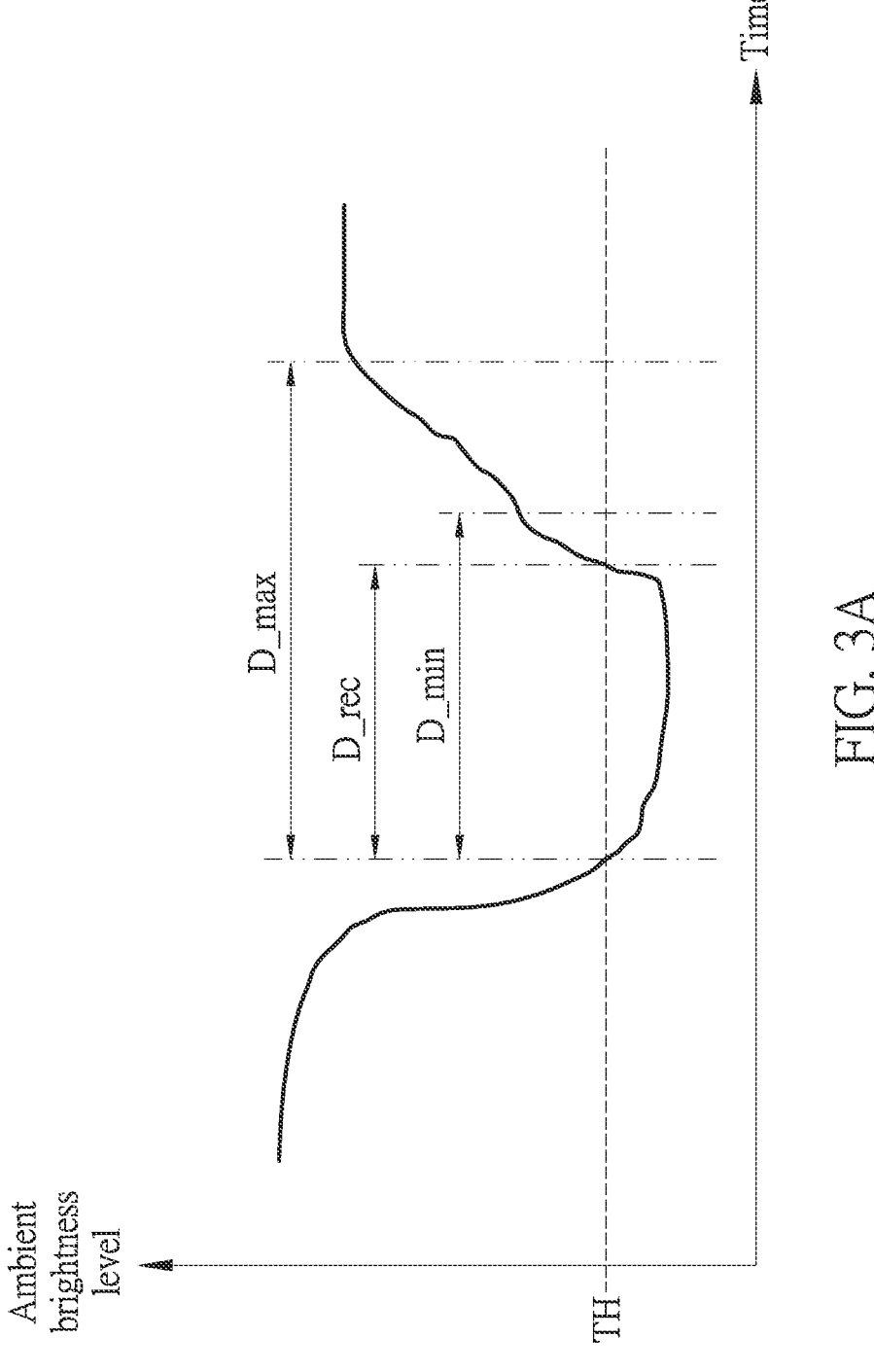
FIG. 3A is a schematic view showing a duration being not greater than a predetermined minimum time length according to one embodiment of the present disclosure.
Figure 3B:
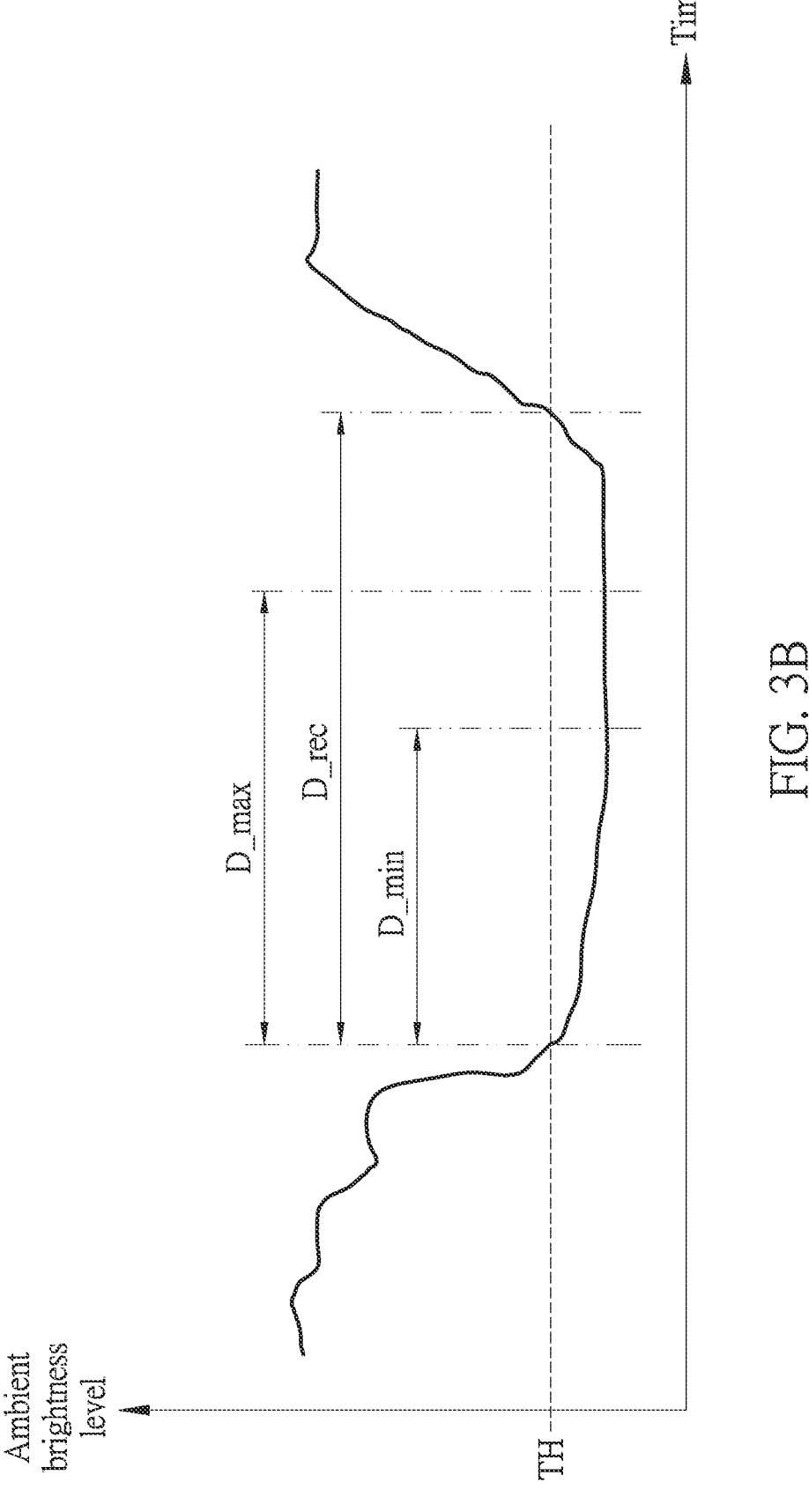
FIG. 3B is a schematic view showing the duration being not less than a predetermined maximum time length according to one embodiment of the present disclosure.

Referring to FIG. 3A and FIG. 3B, FIG. 3A is a schematic view showing a duration being not greater than a predetermined minimum time length according to one embodiment of the present disclosure, and FIG. 3B is a schematic view showing the duration being not less than a predetermined maximum time length according to one embodiment of the present disclosure. As mentioned above, the processor 103 can record a duration D_rec in which the ambient brightness level is lower than a threshold TH, and determine whether or not the duration D_rec is greater than a predetermined minimum time length D_min and less than a predetermined maximum time length D_max.

In other words, the processor 103 can determine whether or not the duration D_rec is between the predetermined minimum time length D_min and the predetermined maximum time length D_max. In addition, when the duration D_rec is not greater than the predetermined minimum time length D_min or not less than the predetermined maximum time length D_max, the processor 103 can determine that the touch-control behavior does not occur, and does not trigger the electronic device 10 to perform the operation corresponding to the touch-control behavior.

Specifically, in the present embodiment, the touch-control behavior can be pressing of a button. As such, the predetermined minimum time length D_min and the predetermined maximum time length D_max can be 0.1 seconds and 1 second, respectively. However, the present disclosure is not limited thereto. As shown in FIG. 3A, when the duration D_rec is not greater than the predetermined minimum time length D_min (i.e., D_rec≤D_min), the processor 103 can determine that pressing of the button does not occur, and does not trigger the electronic device 10 to perform the corresponding operation. In addition, as shown in FIG. 3B, when the duration D_rec is not less than the predetermined maximum time length D_max (i.e., D_rec≥D_max), the processor 103 can also determine that pressing of the button does not occur, and does not trigger the electronic device 10 to perform the corresponding operation.

Furthermore, the predetermined maximum time length D_max can be used to prevent occurrence of misjudgment caused by the electronic device 10 entering a dark room, and the predetermined maximum time length D_max can be set according to the touch-control behavior. For example, when the touch-control behavior is long-pressing of the button, the predetermined maximum time length D_max can be extended to 1.5 seconds, but the present disclosure is not limited thereto.

On the other hand, when a light source is unstable, the duration D_rec in which the ambient brightness level is lower than the threshold TH can also be greater than the predetermined minimum time length D_min and less than the predetermined maximum time length D_max. In order to prevent misjudgment of occurrence of the touch-control behavior due to the influence of the unstable light source, when the duration D_rec is greater than the predetermined minimum time length D_min and less than the predetermined maximum time length D_max, the processor 103 can also determine whether or not the first brightness characteristic of the ambient brightness level before the duration D_rec matches the second brightness characteristic of the ambient brightness level after the duration D_rec.

Figure 4:
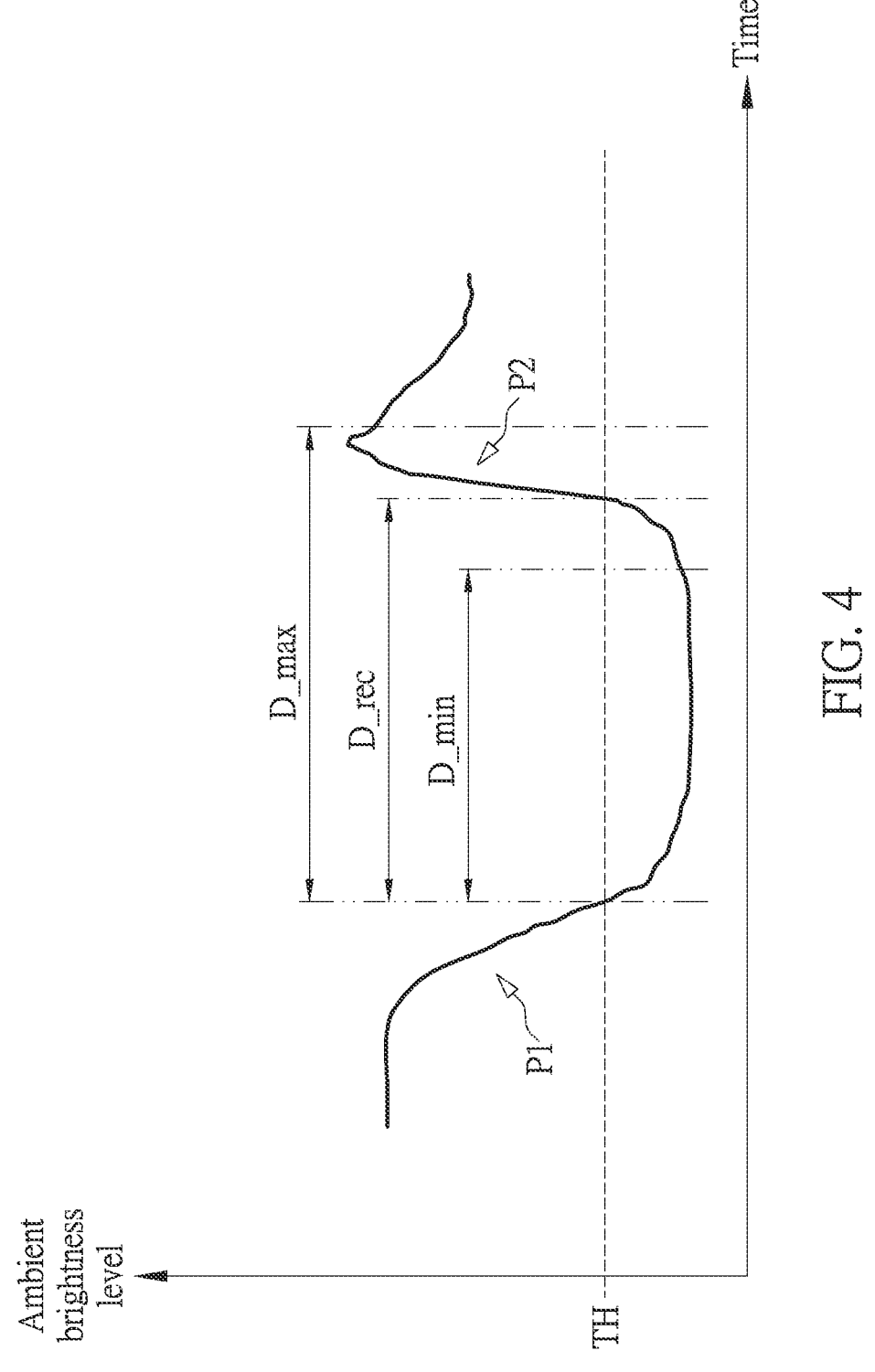
FIG. 4 is a schematic view showing a first brightness characteristic not matching a second brightness characteristic when the duration is greater than the predetermined minimum time length and less than the predetermined maximum time length according to one embodiment of the present disclosure.

Reference is made to FIG. 4, which is a schematic view showing a first brightness characteristic not matching a second brightness characteristic when the duration is greater than the predetermined minimum time length and less than the predetermined maximum time length according to one embodiment of the present disclosure. As shown in FIG. 4, the first brightness characteristic can be a first distribution pattern P1 of the ambient brightness level before the duration D_rec, and the second brightness characteristic can be a second distribution pattern P2 of the ambient brightness level after the duration D_rec. The distribution pattern of the present embodiment refers to a trajectory of changes of the ambient brightness level within a period of time.

Therefore, the first distribution pattern P1 can be a first trajectory of the changes of the ambient brightness level within a period of time before the duration D_rec, and the second distribution pattern P2 can be a second trajectory of the changes of the ambient brightness level within a period of time after the duration D_rec. However, a specific length of the period of time is not limited in the present disclosure.

In addition, by determining whether or not the second distribution pattern P2 after being horizontally rotated matches the first distribution pattern P1, the processor can determine whether or not the first brightness characteristic matches the second brightness characteristic. In the embodiment of FIG. 4, since the horizontally-rotated second distribution pattern P2 does not match the first distribution pattern P1 (i.e., the second trajectory after being horizontally rotated does not match the first trajectory), the processor 103 can determine that the first brightness characteristic does not match the second brightness characteristic.

In response to determining that the first brightness characteristic does not match the second brightness characteristic, the processor 103 can determine that the touch-control behavior does not occur, and does not trigger the electronic device 10 to perform the operation corresponding to the touch-control behavior. That is to say, if there is a significant difference between the ambient brightness levels before and after the duration D_rec, the processor 103 can determine that the ambient brightness level is lower than the threshold TH due to the instability of the light source.

Figure 5:
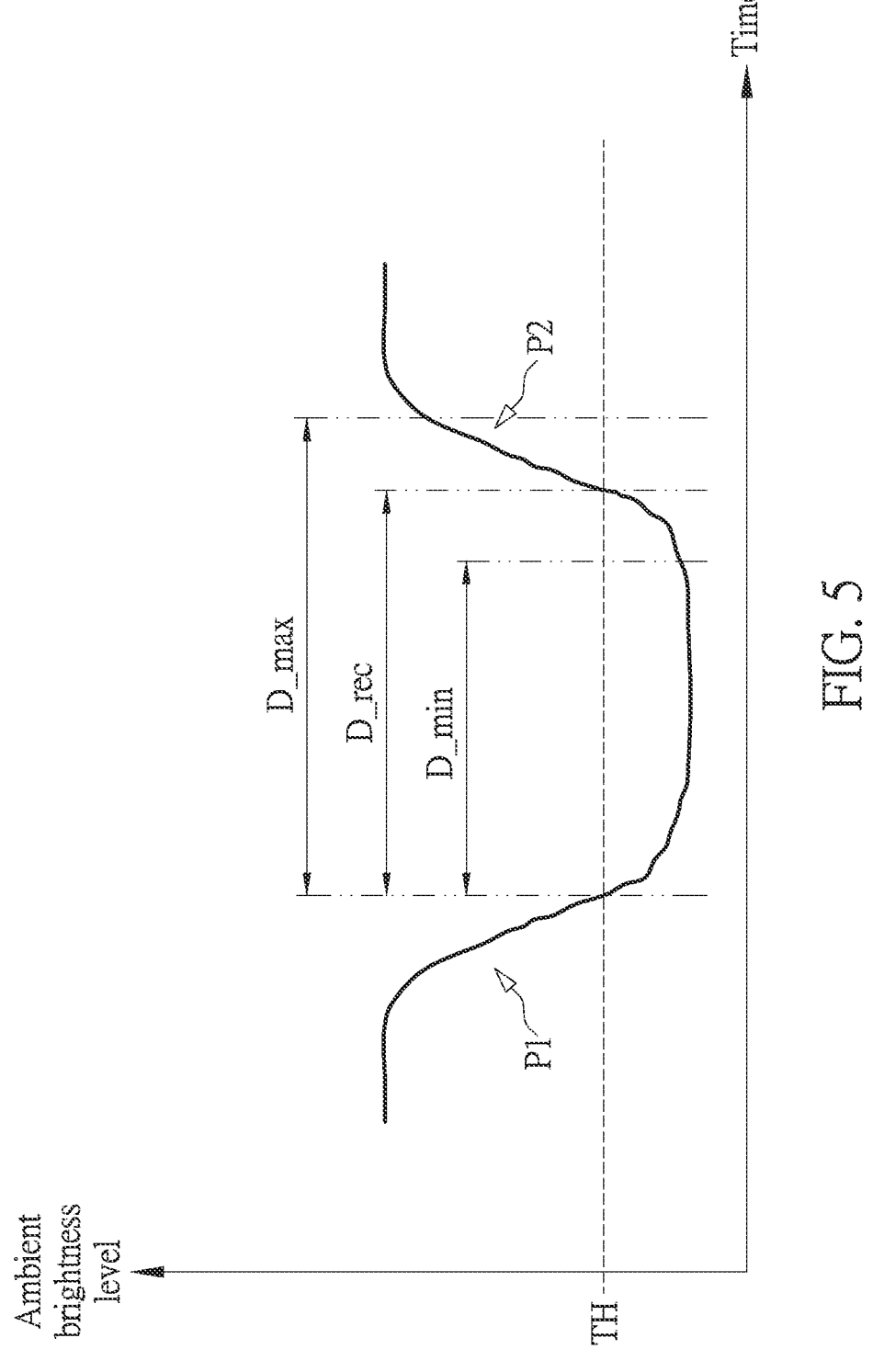
FIG. 5 is a schematic view showing the first brightness characteristic matching the second brightness characteristic when the duration is greater than the predetermined minimum time length and less than the predetermined maximum time length according to one embodiment of the present disclosure.

Reference is made to FIG. 5, which is a schematic view showing the first brightness characteristic matching the second brightness characteristic when the duration is greater than the predetermined minimum time length and less than the predetermined maximum time length according to one embodiment of the present disclosure. As shown in FIG. 5, when the touch-control behavior is pressing of the button, the users can cover the light sensor of the electronic device for 0.4 seconds with their fingers. As previously mentioned, the sampling frequency of the present embodiment can be 20 times per second. Hence, after the processor 103 obtains a first piece of data in which the ambient brightness level is lower than the threshold TH, if the ambient brightness level is lower than the threshold TH in eight consecutive pieces of data, and if the ambient brightness level is greater than the threshold TH in a ninth piece of data, the processor 103 can calculate that the current duration D_rec is 0.4 seconds.

In addition, when the predetermined minimum time length D_min and the predetermined maximum time length D_max are respectively 0.1 seconds and 1 second, since the duration D_rec is between 0.1 seconds and 1 second (i.e., D_min<D_rec<D_max), the processor 103 can further determine whether or not the first brightness characteristic matches the second brightness characteristic. In the embodiment of FIG. 5, since the horizontally-rotated second distribution pattern P2 matches the first distribution pattern P1 (i.e., the second trajectory after being horizontally rotated matches the first trajectory), the processor 103 can determine that the first brightness characteristic matches the second brightness characteristic.

In response to determining that the first brightness characteristic matches the second brightness characteristic, the processor 103 can determine occurrence of the touch-control behavior, and triggers the electronic device 10 to perform the operation corresponding to the touch-control behavior. It should be noted that, in the present disclosure, the operation corresponding to the touch-control behavior is not limited, and specific implementations of the processor 103 to trigger the electronic device 10 for performing the operation are also not limited.

In the present embodiment, the processor 103 can trigger the electronic device 10 to turn on other applications, but the present disclosure is not limited thereto. Furthermore, a time length of a vibration feedback (e.g., 0.2 seconds) can be designed in the present embodiment. In this way, in response to determining occurrence of the touch-control behavior, the processor 103 can control a vibrator inside the electronic device 10 to vibrate for 0.2 seconds, so as to provide a touch-control feedback effect.

Figure 6:
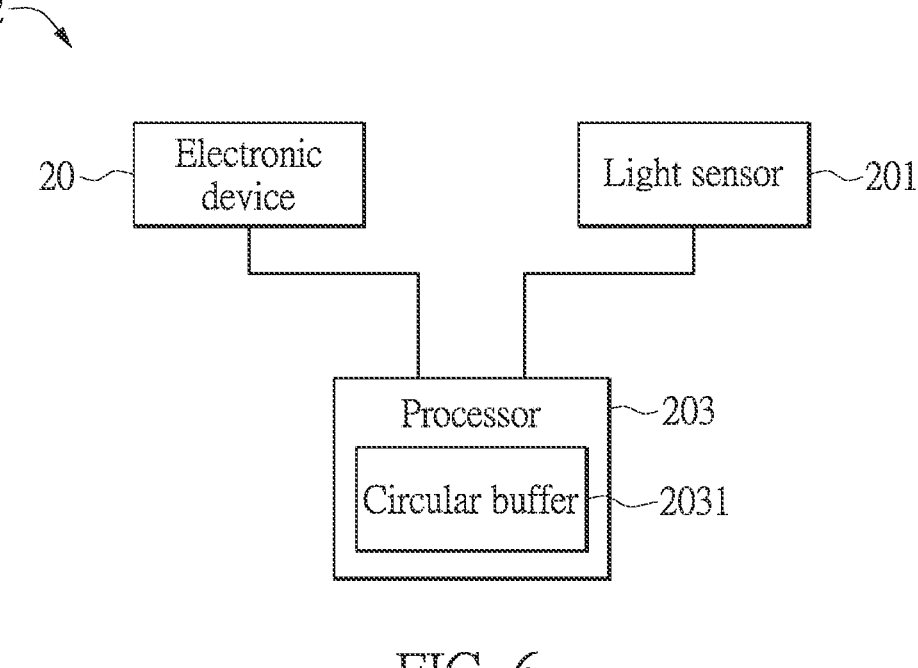
FIG. 6 is a functional block diagram of a touch-control system according to one embodiment of the present disclosure.

On the other hand, the light sensor 101 and the processor 103 can also be elements independent of the electronic device 10. Therefore, the present disclosure also provides a touch-control system to which the aforementioned touch-control method is applicable. Reference is made to FIG. 6, which is a functional block diagram of a touch-control system according to one embodiment of the present disclosure. As shown in FIG. 6, a touch-control system 2 can include an electronic device 20, a light sensor 201, and a processor 203.

Similarly, the electronic device 20 can be, for example, a mobile phone or a tablet, but the present disclosure is not limited thereto. The light sensor 201 and the processor 203 are independent elements disposed outside of the electronic device 20. The light sensor 201 can be an ambient light detector disposed outside of the electronic device 20, and sends the obtained ambient brightness level to the processor 203.

The processor 203 can be implemented by cooperation of hardware, software, and/or firmware, and includes a circular buffer 2031 to sequentially save the ambient brightness level. Specific implementations of the processor 203 are also not limited in the present disclosure. The processor 203 can be coupled to the light sensor 201 and the electronic device 20 through a wired communication apparatus or a wireless communication apparatus, and can be configured to execute the touch-control method of the present embodiment. Relevant details thereof have already been mentioned above, and will not be reiterated herein.

In other embodiments, if the stability of the light source is guaranteed or the influence of the unstable light source is not taken into consideration, step S140 can be omitted from the touch-control method. That is to say, if the determination result of step S130 is 'yes', the touch-control method of other embodiments can proceed to step S150. If the determination result of step S130 is 'no', the touch-control method of other embodiments can return to step S120. Relevant details thereof have also been mentioned above, and will not be reiterated herein.

In conclusion, the touch-control method, the electronic device, and the touch-control system of the present disclosure use the light sensor as the touch-control button. In the touch-control method, the electronic device, and the touch-control system provided by the present disclosure, by virtue of "determining, in response to the duration in which the ambient brightness level is lower than the threshold being greater than the predetermined minimum time length and less than the predetermined maximum time length, whether or not the first brightness characteristic matches the second brightness characteristic," misjudgment of occurrence of the touch-control behavior due to the influence of an unstable light source can be prevented.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A touch-control method, wherein the touch-control method is applied to an electronic device that comprises a light sensor and a processor, and the touch-control method is executed by the processor, the touch-control method comprising:

obtaining an ambient brightness level via the light sensor;

recording a duration in which the ambient brightness level is lower than a threshold, and determining, in response to the duration being greater than a predetermined minimum time length and less than a predetermined maximum time length, whether or not a first brightness characteristic of the ambient brightness level before the duration matches a second brightness characteristic of the ambient brightness level after the duration;

determining, in response to determining that the first brightness characteristic matches the second brightness characteristic, occurrence of a touch-control behavior, and triggering the electronic device to perform an operation corresponding to the touch-control behavior; and determining, in response to the duration being less than or equal to the predetermined minimum time length, or the duration being greater than or equal to the predetermined maximum time length, or the first brightness characteristic not matching the second brightness characteristic, that no touch-control behavior has occurred.

2. The touch-control method according to claim 1, further comprising:

re-recording, in response to determining that the first brightness characteristic does not match the second brightness characteristic, the duration in which the ambient brightness level is lower than the threshold.

3. The touch-control method according to claim 1, wherein the first brightness characteristic is a first distribution pattern of the ambient brightness level before the duration, and the second brightness characteristic is a second distribution pattern of the ambient brightness level after the duration.

4. The touch-control method according to claim 1, wherein obtaining the ambient brightness level via the light sensor comprises:

configuring the light sensor to periodically obtain the ambient brightness level, and sequentially saving the ambient brightness level.

5. The touch-control method according to claim 4, wherein sequentially saving the ambient brightness level comprises sequentially saving the ambient brightness level with a circular buffer, and the light sensor is configured to periodically obtain the ambient brightness level according to a sampling frequency.

6. An electronic device, comprising:

a light sensor; and a processor coupled to the light sensor, wherein the processor is configured to execute processes of:

obtaining an ambient brightness level via the light sensor;

recording a duration in which the ambient brightness level is lower than a threshold, and determining, in response to the duration being greater than a predetermined minimum time length and less than a predetermined maximum time length, whether or not a first brightness characteristic of the ambient brightness level before the duration matches a second brightness characteristic of the ambient brightness level after the duration;

determining, in response to determining that the first brightness characteristic matches the second brightness characteristic, occurrence of a touch-control behavior, and triggering the electronic device to perform an operation corresponding to the touch-control behavior; and determining, in response to the duration being less than or equal to the predetermined minimum time length, or the duration being greater than or equal to the predetermined maximum time length, or the first brightness characteristic not matching the second brightness characteristic, that no touch-control behavior has occurred.

7. The electronic device according to claim 6, wherein the processor is further configured to execute a process of:

re-recording, in response to determining that the first brightness characteristic does not match the second brightness characteristic, the duration in which the ambient brightness level is lower than the threshold.

8. The electronic device according to claim 6, wherein the first brightness characteristic is a first distribution pattern of the ambient brightness level before the duration, and the second brightness characteristic is a second distribution pattern of the ambient brightness level after the duration.

9. The electronic device according to claim 6, wherein the process of obtaining the ambient brightness level via the light sensor comprises:

configuring the light sensor to periodically obtain the ambient brightness level, and sequentially saving the ambient brightness level.

10. The electronic device according to claim 9, wherein the processor sequentially saves the ambient brightness level with a circular buffer, and the light sensor is configured to periodically obtain the ambient brightness level according to a sampling frequency.

11. A touch-control system, comprising:

an electronic device;

a light sensor; and a processor coupled to the light sensor and the electronic device, wherein the processor is configured to execute processes of:

obtaining an ambient brightness level via the light sensor;

recording a duration in which the ambient brightness level is lower than a threshold, and determining, in response to the duration being greater than a predetermined minimum time length and less than a predetermined maximum time length, whether or not a first brightness characteristic of the ambient brightness level before the duration matches a second brightness characteristic of the ambient brightness level after the duration;

determining, in response to determining that the first brightness characteristic matches the second brightness characteristic, occurrence of a touch-control behavior, and triggering the electronic device to perform an operation corresponding to the touch-control behavior; and determining, in response to the duration being less than or equal to the predetermined minimum time length, or the duration being greater than or equal to the predetermined maximum time length, or the first brightness characteristic not matching the second brightness characteristic, that no touch-control behavior has occurred.

12. The touch-control system according to claim 11, wherein the processor is further configured to execute a process of:

re-recording, in response to determining that the first brightness characteristic does not match the second brightness characteristic, the duration in which the ambient brightness level is lower than the threshold.

13. The touch-control system according to claim 11, wherein the first brightness characteristic is a first distribution pattern of the ambient brightness level before the duration, and the second brightness characteristic is a second distribution pattern of the ambient brightness level after the duration.

14. The touch-control system according to claim 11, wherein the process of obtaining the ambient brightness level via the light sensor comprises:

configuring the light sensor to periodically obtain the ambient brightness level, and sequentially saving the ambient brightness level.

15. The touch-control system according to claim 14, wherein the processor sequentially saves the ambient brightness level with a circular buffer, and the light sensor is configured to periodically obtain the ambient brightness level according to a sampling frequency.

16. A touch-control method, wherein the touch-control method is applied to an electronic device that comprises a light sensor and a processor, and the touch-control method is executed by the processor, the touch-control method comprising:

obtaining an ambient brightness level via the light sensor;

recording a duration in which the ambient brightness level is lower than a threshold, and determining whether or not the duration is greater than a predetermined minimum time length and less than a predetermined maximum time length;

determining, in response to determining that the duration is greater than the predetermined minimum time length and less than the predetermined maximum time length, occurrence of a touch-control behavior, and triggering the electronic device to perform an operation corresponding to the touch-control behavior; and determining, in response to determining that the duration is less than or equal to the predetermined minimum time length or the duration is greater than or equal to the predetermined maximum time length, that no touch-control behavior has occurred.

17. An electronic device, comprising:

a light sensor; and a processor coupled to the light sensor, wherein the processor is configured to execute processes of:

obtaining an ambient brightness level via the light sensor;

recording a duration in which the ambient brightness level is lower than a threshold, and determining whether or not the duration is greater than a predetermined minimum time length and less than a predetermined maximum time length;

determining, in response to determining that the duration is greater than the predetermined minimum time length and less than the predetermined maximum time length, occurrence of a touch-control behavior, and triggering the electronic device to perform an operation corresponding to the touch-control behavior; and determining, in response to determining that the duration is less than or equal to the predetermined minimum time length or the duration is greater than or equal to the predetermined maximum time length, that no touch-control behavior has occurred.

18. A touch-control system, comprising:

an electronic device;

a light sensor; and a processor coupled to the light sensor and the electronic device, wherein the processor is configured to execute processes of:

obtaining an ambient brightness level via the light sensor;

recording a duration in which the ambient brightness level is lower than a threshold, and determining whether or not the duration is greater than a predetermined minimum time length and less than a predetermined maximum time length;

determining, in response to determining that the duration is greater than the predetermined minimum time length and less than the predetermined maximum time length, occurrence of a touch-control behavior, and triggering the electronic device to perform an operation corresponding to the touch-control behavior; and determining, in response to determining that the duration is less than or equal to the predetermined minimum time length or the duration is greater than or equal to the predetermined maximum time length, that no touch-control behavior has occurred.

19. The touch-control method according to claim 1, further comprising:

registering the light sensor, in an operating system of the electronic device, to act as a touch-control button in response to an application executed by the processor being turned on.

20. The touch-control method according to claim 1, further comprising:

controlling a vibrator within the electronic device to vibrate in response to determining the occurrence of the touch-control behavior.

* * * * *